Patented Nov. 6, 1923.

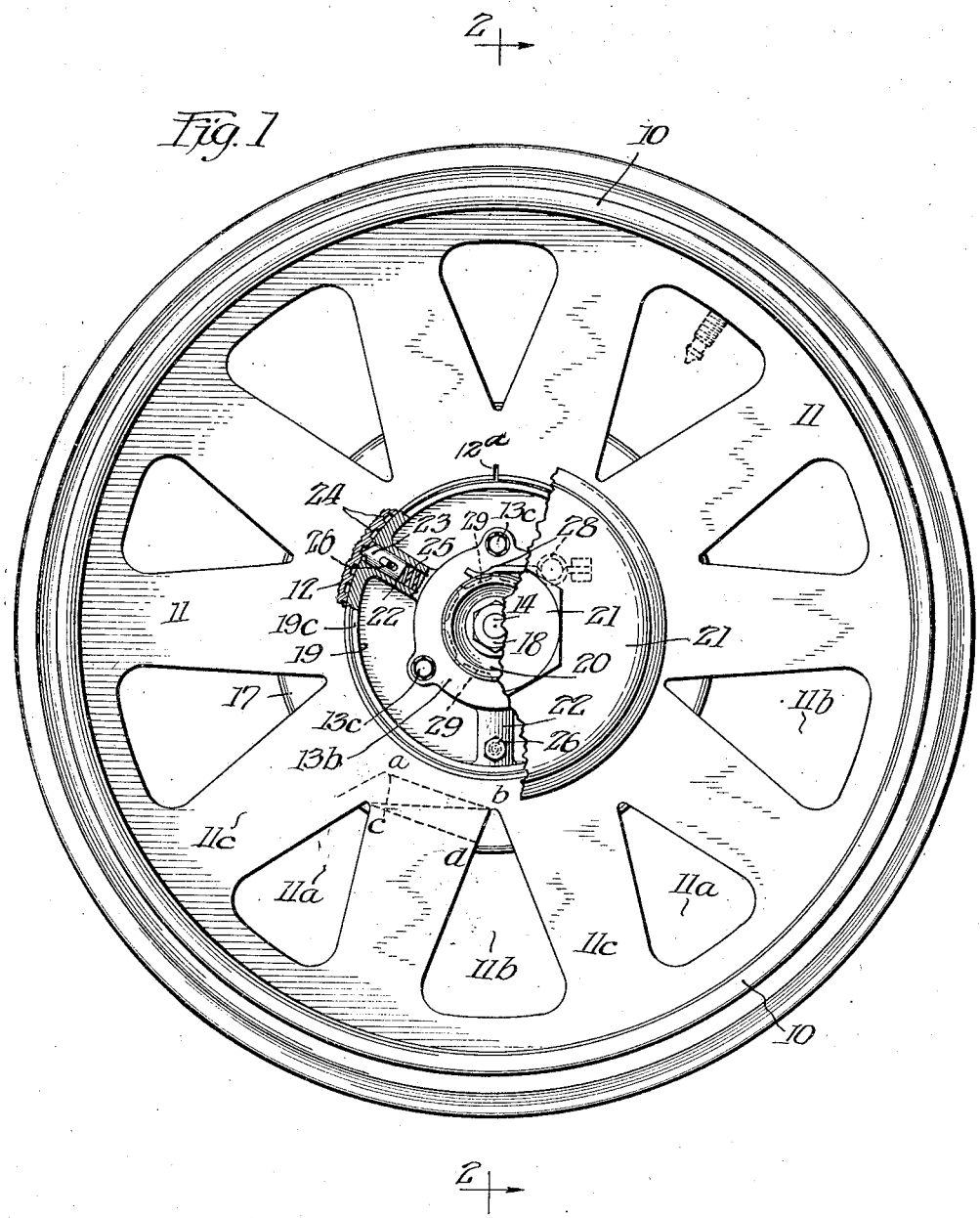

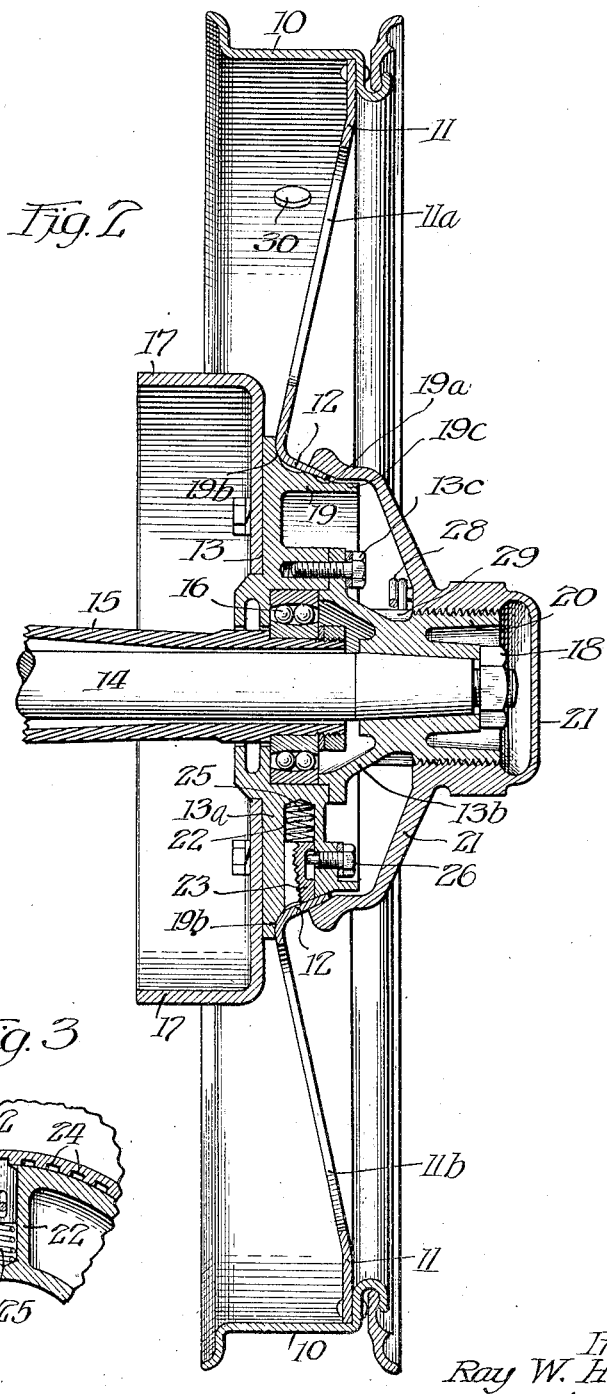

1,473,406

UNITED STATES PATENT OFFICE.

RAY W. HARROUN, OF DETROIT, MICHIGAN.

VEHICLE WHEEL.

Application filed October 23, 1920. Serial No. 420,101.

*To all whom it may concern:*

Be it known that I, RAY W. HARROUN, a citizen of the United States, residing at Detroit, in the county of Wayne and State of Michigan, have invented certain new and useful Improvements in Vehicle Wheels, of which the following is a specification.

This invention relates to improvements in metal vehicle wheels, and more particularly to those of the demountable type, commonly known as disc wheels.

Wheels of this type, as now generally employed, comprise broadly an outer rim having rigidly secured thereto a metal disc or annulus which extends inwardly and is removably clamped in engagement with a hub member carried by or associated with the axle of the vehicle. In these wheels as now constructed the disc or annulus is secured to the hub member by positive retaining means, such as bolts or the like, and the disc is tapered radially outward from the hub, so that it is thinner in the vicinity of the rim than at the hub, this being for the purpose of providing the desired flexibility to the wheel in absorbing side thrusts. This tapering of the discs is an expensive and troublesome operation, and the use of bolts or the like in clamping the wheel proper to the hub member involves a considerable expenditure of time and labor in the mounting and demounting operations. Furthermore, it has been found that in the use of these present-day wheels the retaining bolts invariably have to be taken up or tightened after the wheel has been in use only a comparatively short time. A further disadvantage in the use of these wheels is the inaccessibility of the tire filler stem, due to the fact that the disc, which is imperforate, engages the rim in advance of said stem, so that the latter can only be reached from the rear or inner side of the wheel, an obvious hardship.

One object of the present invention is to provide a demountable metal wheel of the disc type, wherein friction is relied upon in maintaining the wheel proper operatively associated with the hub member. Another object is the provision of a single element for producing and maintaining such frictional engagement, as well as the provision of means whereby the driving or braking power encountered by or transmitted to the wheel may be utilized in retaining such element in its proper adjusted position, the tendency of such power being to increase the clamping or frictional engagement, thereby precluding the possibility of the wheel becoming loose or misalined on its hub. Another object is the provision of automatic means adapted to permit tightening of the parts, but operable to prevent any loosening thereof.

A further object of the present invention is to provide in a wheel of the class described a disc or annulus of uniform thickness which shall possess the requisite degree of flexibility and also the desired shock-diffusing and distributing qualities.

Further objects and advantages of the invention will become apparent to those skilled in the art from the following description, taken in connection with the accompanying drawings, wherein one form of the invention is illustrated.

Figure 1 is a side elevation of a wheel constructed in accordance with the present invention;

Fig. 2 is a sectional view, taken on the line 2—2 of Fig. 1; and

Fig. 3 is a detail view, showing the ratchet and pawl mechanism which it is preferred to use in connection with wheels which are not driven.

Referring more in detail to the drawings, my improved wheel is shown as comprising an outer rim 10, having riveted or otherwise rigidly attached thereto at one side of the center an inwardly directed metal disc or annulus 11, said annulus terminating around its inner periphery in an outstanding collar 12, of frusto-conical design. 13 designates the hub member of the wheel, the same being in two parts 13$^a$ and 13$^b$ connected together, as at 13$^c$. The part 13$^b$ directly engages the axle 14, and is fixed to rotate therewith in any well-known manner. The axle shown in the illustration of my invention is a rear driven axle of the floating type, the load being carried by the axle housing 15 on which the hub part 13$^a$ is mounted, suitable anti-friction bearings 16 being interposed. Bolted to the inner face of the hub is the usual brake drum 17. A nut 18 engages the outer end of the axle and serves to hold the hub against longitudinal displacement. The part 13$^a$ of the hub 13 is provided with a driving drum 19, which extends in a direction opposite to that in which the brake drum extends, said drum being provided around its outer periphery with a plurality of circumferential conical seats 19ᵃ and 19ᵇ of different angularity, designed to receive the collar 12 and thus support the disc or annulus, as clearly shown in Fig. 2. The seat 19ᵇ, of greater angularity, serves as a centering abutment, against which the disc is moved while the seat 19ᵃ, of lesser angularity, engages the inner surface of the collar 12 adjacent the outer edge thereof.

The portion 13ᵇ of the hub is provided with a screw-threaded collar 20 adapted to receive the hub cap 21, the latter being flared outwardly and adapted to engage around the outer surface of the collar 12 immediately opposite the seat 19ᵃ, as shown, the arrangement being such that upon tightening said cap the wheel proper comprising the annulus and rim, is first moved inwardly over the drum 19 until the annulus is seated firmly against the seat 19ᵇ, after which the edge of the collar 12 is clamped on its seat 19ᵃ. In this manner the wheel is maintained in operative position on the hub by friction alone, the engagement between the annulus and seat 19ᵇ serving primarily to true the wheel on the hub during the clamping operation, while the gripping or clamping of the collar of said annulus on its seat 19ᵃ, between cap 21 and drum 19, serves to hold the wheel in proper position and to transmit the driving power from the hub to the wheel proper. In this connection it will, of course, be appreciated that a certain amount of power is also transmitted from the hub to the wheel proper through engagement of the disk with the seat 19ᵇ. In order that the wheel may be supported by the drum 19 when the cap 21 is not in engagement therewith, as in a mounting or demounting operation, said drum is provided with a cylindrical extension 19ᶜ, upon which the edge of the collar 12 may ride when the disc is not seated.

The lead of the thread on the collar 20 of the hub is, preferably, arranged reversely with respect to the direction of application of the forward driving force transmitted to the wheel, so that such force or power will have a tendency to tighten the hub cap 21 through friction between said cap and the collar 12 of the annulus. It will be appreciated that the friction at this point will be greater than at the threads, thus ensuring a tightening of the cap, should the same be loose, and the maintenance of the proper clamping action once the parts are firmly seated. The outer surface of the collar is, preferably, tapered slightly toward the edge thereof, as shown, to facilitate the removal of the cap and to provide an increased wedging action between the latter and said collar when these parts are in operative position. As a further means of enhancing the clamping or gripping action between the cap 21 and collar 12, the latter is split, as at 12ᵃ, at intervals around its periphery, so as to render the same contractable on its seat 19ᵃ during the final adjustment of said cap.

Housed within the part 13ᵃ of the hub 13, in suitable radially-disposed chambers 22, are pawls 23, having reduced portions in the form of teeth which project through the drum 19 intermediate the seats 19ᵃ and 19ᵇ thereof, and into engagement with serrations or notches 24 provided on the inner surface of the collar 12 of the annulus 11. Coiled springs 25, interposed between the pawls and the base of the chambers 22, serve normally to urge said pawls outwardly and into engagement with the serrations of the collar. Suitable means, such as set screws 26, may be provided to prevent turning of the pawls within their chambers and also to limit their outward movement, so that they will not be displaced when the wheel is demounted. The teeth of these pawls are so formed with relation to the serrations 24 and the direction of application of the driving power that they permit relative movement of the wheel with respect to the hub 13 in a direction that will serve to take up on the hub cap 21 and thus tighten the clamping engagement, but to prevent movement thereof in a reverse direction. In other words, this ratchet and pawl mechanism for a driven wheel is so arranged as to permit of said wheel turning with relation to its hub in a direction reverse with respect to the forward movement of the car, or in the direction of the lead of the thread on the collar 20. Movement of the wheel in the opposite direction, such as would occur when the brakes were applied, is prevented.

Where the front wheels of a vehicle are driven, ratchet and pawl mechanism similar to that just described may be employed in connection with such wheels also. Where the front wheels of a vehicle are not driven, however, but are provided with brakes, a ratchet and pawl mechanism just the reverse of that previously described may be employed, so that the braking power may be utilized in tightening the cap 21 and in maintaining said cap in proper position. Where the front wheels of the vehicle are neither driven nor provided with brakes, it is preferred to replace the pawls 23 with keys, such as shown at 27 in Fig. 3, said keys serving to prevent relative movement between the wheels and their hubs in either direction.

Carried on the inner surface of the hub cap 21 is an auxiliary retaining element 28, in the form of a coiled spring, the outer end of which is shaped for cooperation with suitable elongated notches 29 formed in the part 13ᵇ of the hub 13, immediately adjacent the screw-threaded portion 20 thereof. This retaining device, as will be appreciated, serves to prevent accidental displacement of the hub cap 21, but permits of the free movement thereof in removing or operatively positioning the same. The construction of this element 28 and its position with respect to the lead of the hub thread renders the same slightly more resistant to a removal of the cap than to an adjustment of the same into operative position, as will be readily appreciated.

An important feature of the present invention is the construction of the metal disc or annulus, the latter being preferably constructed of metal of uniform thickness, as distinguished from the tapered discs now commonly employed. The desired flexibility or resiliency, requisite to the proper functioning of a vehicle wheel, is obtained in the present construction by providing the disc intermediate its inner and outer peripheries with a plurality of radially-disposed triangular openings 11$^a$ and 11$^b$, the smaller ones 11$^a$ alternating with the larger ones 11$^b$ so as to provide spoke-like portions 11$^c$, the sides of which are of different length. The purpose of this construction is not only to provide an artistic design, pleasing to the eye both when the wheel is stationary and rotating, but primarily to prevent stress localization. To illustrate, if the triangular openings 11$^a$ and 11$^b$ were all of the same size, with their apices terminating equi-distantly from the center of the wheel, the bending stress encountered by the spoke-like portions 11$^c$ would be localized along a well-defined line $a$—$b$—see Fig. 1. By offsetting the peaks of these triangular openings, however, as previously described, these maximum bending stresses are distributed substantially throughout the area $a$, $b$, $c$, $d$, thus overcoming all tendency of these stresses to localize. By so constructing the disc or annulus, the desired resiliency is imparted to the wheel, while at the same time the necessary strength is secured, notwithstanding the reduction in weight, and the expensive operation of tapering the disc, such as is at present the practice, is dispensed with.

It will be obvious to those skilled in the art that the method of shock or stress distribution above described might also be carried out by providing offset openings of the same size in the disc. Such construction would result in a distribution at the outer ends of the spoke portions as well as at the inner ends thereof. This same result, i. e. stress distribution at both ends of the spokes, could be accomplished by also offsetting the bases of the triangles in the construction illustrated.

It will be appreciated that by providing openings in the annulus or disc the tire stem opening 30 may be so positioned in the rim that the stem when the tire is in position will be readily accessible through one of said openings from the outer side of the wheel.

In the appended claims the term "power" is used in a broad sense, and is intended to cover both driving and braking power.

It will be obvious to those skilled in the art that the present invention is susceptible of various changes and modifications without departing from the spirit of the invention, and accordingly it is not desired to limit the same, except where limitations appear in the appended claims.

I claim:—

1. In a wheel of the class described, a hub member having a circumferential seat, a rim, an annulus secured thereto and adapted to engage said seat around its inner periphery, a cap screw-threadedly engageable with said hub and adapted to frictionally clamp said parts in position, and auxiliary means to prevent relative movement of said annulus with respect to said hub in one direction while permitting such movement in a reverse direction.

2. In a wheel of the class described, a hub member having a circumferential seat, a rim, an annulus secured thereto and adapted to engage said seat around its inner periphery, a cap screw threadedly engageable with said hub and adapted to frictionally clamp said parts in position, and auxiliary means to prevent relative movement of said annulus with respect to said hub in one direction while permitting such movement in a reverse direction, said means comprising a pawl carried by said hub and coacting with serrations formed on said annulus.

3. In a metal vehicle wheel of the class described, a hub member, a wheel-supporting drum carried thereby and provided with a plurality of circumferential seats, a rim, an annulus carried by said rim and shaped around its inner periphery for engagement with said seats, and means for frictionally maintaining said parts in operative relation.

4. A vehicle wheel comprising an outer rim, a metal annulus secured thereto and terminating around its inner periphery in a collar, a hub member adapted to receive said annulus and provided with a seat for said collar, and a removable hub cap engaging over said collar for frictionally clamping said parts together and for independently preventing relative rotative movements of said hub and annulus.

5. In a vehicle wheel of the class described, a hub member provided with a drum, a plurality of conical seats of different angularity formed on said drum, a rim, an annulus carried by said rim and being shaped around its inner periphery for engagement with said seats, and frictional means for maintaining said engagement.

6. In a vehicle wheel of the class described, a hub member provided with a drum, a plurality of conical seats of different angularity formed on said drum, a rim, an annulus carried by said rim and shaped around its inner periphery for engagement with said seats, frictional means for maintaining said engagement, and automatic means permitting relative movement of said annulus with respect to said hub in one direction while preventing such movement in a reverse direction.

7. In a vehicle wheel of the class described, a hub member provided with a drum, a plurality of conical seats of different angularity formed on said drum, a rim, an annulus carried by said rim and shaped around its inner periphery for engagement with said seats, frictional means for maintaining said engagement, and automatic means permitting relative movement of said annulus with respect to said hub in one direction while preventing such movement in a reverse direction, said means comprising a pawl carried by said hub and projecting through said drum intermediate said seats into engagement with said annulus.

8. In a vehicle wheel of the class described, a hub member provided with a drum, a plurality of conical seats of different angularity formed on said drum, a rim, an annulus carried by said rim and shaped around its inner periphery for engagement with said seats, the seat of greater angularity serving primarily as a centering abutment for said annulus, and means cooperating with the seat of lesser angularity for clamping said annulus firmly in position after the same has been properly centered.

9. In a wheel, a rim, a metallic spoke member extending inwardly therefrom and terminating in an annular collar, a hub member provided with a seat adapted to receive said collar, and a cap member engageable with said hub member and provided with means for clamping said collar on said seat, said spoke member being capable of rotation with respect to said hub member in a direction to increase said clamping engagement.

10. In a vehicle wheel, a metallic disc extending from the hub to the rim thereof and being apertured in such wise as to provide spoke-like portions, the sides of which are of different length.

11. In a vehicle wheel, a metallic disc extending from the hub to the rim thereof and being apertured in such wise as to provide spoke-like portions, the sides of which are of different length, the latter terminating equidistantly from the rim of said wheel and unequi-distantly from the hub thereof.

12. A vehicle wheel comprising a rim, hub and spoke members, the normal lines of stress localization at the base of said spoke members being inclined with respect to the longitudinal axes thereof to provide for stress distribution.

13. A vehicle wheel comprising an outer rim, a metal annulus secured thereto and terminating around its inner periphery in a frustro conical-shaped collar, a hub member adapted to receive said annulus and provided with a seat for said collar, and means engaging over said collar for frictionally clamping the latter on said seat and for independently preventing relative rotative movements of said hub and annulus.

14. In a vehicle wheel of the class described, a hub member provided with a drum, a plurality of annular seats, formed in said drum, a rim, an annulus carried by said rim and being shaped around its inner periphery for engagement with said seats, and frictional means for maintaining said engagement.

In testimony whereof, I have subscribed my name.

RAY W. HARROUN.